United States Patent
Fei et al.

(10) Patent No.: US 11,916,478 B2
(45) Date of Patent: Feb. 27, 2024

(54) PARALLEL CHARGER CIRCUIT WITH BATTERY FEEDBACK CONTROL

(71) Applicant: Google LLC, Mountain View, CA (US)

(72) Inventors: Chao Fei, Menlo Park, CA (US); Douglas Osterhout, San Jose, CA (US); Srikanth Lakshmikanthan, Milpitas, CA (US); Liang Jia, Mountain View, CA (US); Li Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 433 days.

(21) Appl. No.: 17/425,375

(22) PCT Filed: Aug. 31, 2020

(86) PCT No.: PCT/US2020/048802
§ 371 (c)(1),
(2) Date: Jul. 23, 2021

(87) PCT Pub. No.: WO2022/046117
PCT Pub. Date: Mar. 3, 2022

(65) Prior Publication Data
US 2022/0302734 A1 Sep. 22, 2022

(51) Int. Cl.
*H02M 3/00* (2006.01)
*H02M 3/156* (2006.01)
(Continued)

(52) U.S. Cl.
CPC ......... *H02M 3/156* (2013.01); *H02J 7/00308* (2020.01); *H02J 7/00716* (2020.01); *H02J 7/342* (2020.01)

(58) Field of Classification Search
CPC .. H02M 3/156; H02M 3/1584; H02J 7/00308; H02J 7/00716; H02J 7/342; H02J 7/34; H02J 1/109
See application file for complete search history.

(56) References Cited

U.S. PATENT DOCUMENTS 7,663,345 B2 * 2/2010 Ozawa ................. H02J 7/0068
320/140
8,004,237 B2 8/2011 Manor et al.
(Continued)

FOREIGN PATENT DOCUMENTS

CN 205544410 U * 8/2016 ............ H02J 7/0042
CN 207218276 U * 4/2018
(Continued)

OTHER PUBLICATIONS

Response to Communication Pursuant to Rules 161(1) and 162 EPC dated Feb. 3, 2023, from counterpart European Application No. 20772474.1, filed Jul. 24, 2023, 11 pp.
(Continued)

*Primary Examiner* — Naum Levin
(74) *Attorney, Agent, or Firm* — Shumaker & Sieffert, P.A.

(57) ABSTRACT

In general, techniques are described that are directed to a device that includes a power storage device, an electrical load, and a first regulated power converter including components configured to generate, during a first time period and using electrical energy received from a power source external to the device, a first power signal to charge the power storage device. A second regulated power converter includes components configured to determine a charging current at which to charge the power storage device, determine a total amount of current flowing to the power storage device that includes current sourced by the second power converter less current sinked by the electrical load, and generate, during a second time period that is non-overlapping with the first time period, using electrical energy from the power source and based on determined the total amount of current, a second power signal to charge the power storage device.

20 Claims, 5 Drawing Sheets

(51) Int. Cl.
 *H02J 7/00* (2006.01)
 *H02J 7/34* (2006.01)

(56) References Cited

U.S. PATENT DOCUMENTS

| | | | |
|---|---|---|---|
| 8,441,231 B2 * | 5/2013 | Menegoli | H02M 3/1582 |
| | | | 320/128 |
| 8,513,920 B2 * | 8/2013 | Scaldaferri | H02M 3/158 |
| | | | 320/140 |
| 8,860,372 B2 | 10/2014 | Guang et al. | |
| 9,246,348 B2 * | 1/2016 | Solie | H02J 7/04 |
| 9,293,925 B2 * | 3/2016 | Heng | H02J 7/0068 |
| 9,413,022 B2 * | 8/2016 | Iyer | H01M 8/04917 |
| 9,893,385 B1 * | 2/2018 | Nayar | H01M 10/399 |
| 10,461,623 B2 * | 10/2019 | Choi | G06F 1/26 |
| 10,897,133 B2 * | 1/2021 | Sexton | G01R 27/02 |
| 11,101,674 B2 * | 8/2021 | Walley | H02J 7/00 |
| 2004/0217732 A1 * | 11/2004 | Zhu | B60L 58/40 |
| | | | 320/101 |
| 2011/0140667 A1 | 6/2011 | Moon | |
| 2012/0086276 A1 | 4/2012 | Sawyers | |
| 2018/0041060 A1 * | 2/2018 | Walley | H02J 7/0045 |
| 2019/0081487 A1 | 3/2019 | Baby et al. | |
| 2021/0376723 A1 * | 12/2021 | Jung | H02J 7/00712 |

FOREIGN PATENT DOCUMENTS

| | | | |
|---|---|---|---|
| CN | 109245188 A * | 1/2019 | |
| DE | 102015216809 A1 * | 3/2017 | H02J 7/00 |
| EP | 3211751 A1 | 8/2017 | |
| KR | 20110066646 A * | 12/2009 | |
| TW | 201316653 A * | 4/2013 | H02J 7/022 |
| WO | WO-2020055695 A1 * | 3/2020 | G05F 1/575 |
| WO | WO-2021088122 A1 * | 5/2021 | B60L 53/60 |

OTHER PUBLICATIONS

International Search Report and Written Opinion of International Application No. PCT/US2020/048802, dated May 7, 2021, 12 pp.

* cited by examiner

PARALLEL CHARGER CIRCUIT WITH BATTERY FEEDBACK CONTROL

BACKGROUND

A device may include multiple on-board chargers that are each capable of charging one or more power sources (e.g., batteries) of the device using power received from an external source. The on-board chargers may include a main charger and a parallel charger, each with different characteristics. Depending on charging context, a controller of the device may utilize the main charger or the parallel charger to charge the one or more power sources using the power received from the external source.

BRIEF SUMMARY

In general, this disclosure is directed to devices that include dual on-board regulated chargers. A controller of a device with a regulated main charger and an unregulated parallel charger may regulate an amount of power provided by the unregulated parallel charger by adjusting an amount of power provided by an external power source that is supplying power to the device. For example, the controller may measure an input current of the parallel charger and output a request to the external power source to increase or decrease an amount of current provided to the device based on the measured input current. However, such a scheme may present one or more disadvantages. As one example, communicating with the external power source may introduce latency. As another example, the input current of the parallel charger may not be an accurate representation of how much current is actually being provided to the one or more power storage devices (e.g., as some of the current provided by the parallel charger may be used by an electrical load that includes other system components). These disadvantages may result in an inconsistent amount of power being provided to the one or more power storage devices, which may be undesirable.

In accordance with one or more techniques of this disclosure, a device may include a regulated parallel charger and a controller that regulates operation of the parallel charger based on an amount of current actually being provided to the one or more power storage devices. In this way, the controller may reduce the latency and/or smooth out the amount of power being provided to the one or more power storage devices.

In one example, a device includes a power storage device, an electrical load and a first regulated power converter including components configured to generate, during a first time period and using electrical energy received from a power source external to the device, a first power signal to charge the power storage device. The device further comprising a second regulated power converter including components configured to determine a charging current at which to charge the power storage device, determine a total amount of current flowing to the power storage device that includes current sourced by the second power converter less current sinked by the electrical load, and generate, during a second time period that is non-overlapping with the first time period, using electrical energy received from the power source and based on determined the total amount of current, a second power signal to charge the power storage device at the determined charging current.

In another example, a method includes generating, by a first regulated power converter, a first power signal to charge a power storage device during a first time period and using electrical energy received from a power source. The method includes determining, by a second regulated power converter, a charging current at which to charge the power storage device. Determining, by the second regulated power converter, a total amount of current flowing to the power storage device that includes current sourced by the second power converter less current sinked by an electrical load. Generating, by the second regulated power converter, during a second time period that is non-overlapping with the first time period, using electrical energy received from the power source and based on the determined total amount of current, a second power signal to charge the power storage device at the determined charging current.

In another example, a system includes a device comprising a power storage device, an electrical load, and a first circuit for generating, during a first time period and using electrical energy received from a power source external to the device, a first power signal to charge the power storage device. The device also including a second circuit for determining a charging current at which to charge the power storage device. The second circuit further determines a total amount of current flowing to the power storage device that includes current sourced by the second power converter less current sinked by the electrical load. Using electrical energy received from the power source and based on the determined total amount of current the second circuit generates, during a second time period that is non-overlapping with the first time period, a second power signal to charge the power storage device at the determined charging current.

Additional features, advantages, and embodiments of the disclosed subject matter may be set forth or apparent from consideration of the following detailed description, drawings, and claims. Moreover, it is to be understood both the foregoing summary and the following detailed description are illustrative and are intended to provide further explanation without limiting the scope of the claims.

DETAILED DESCRIPTION

Figure 1:
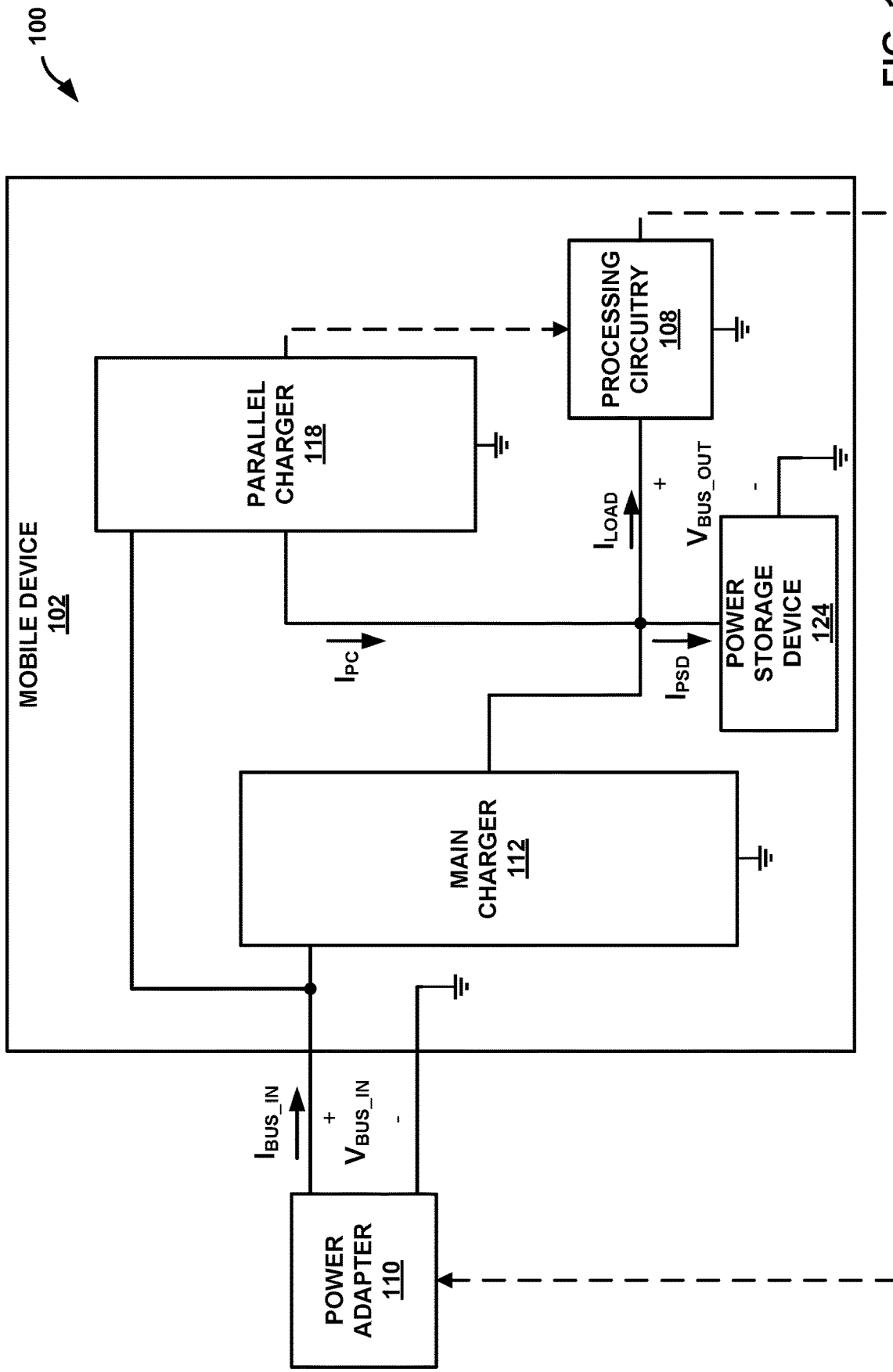
FIG. 1 is a block diagram illustrating an example of a system that includes a mobile device and a power adapter in accordance with various aspects of this disclosure.

FIG. 1 is a block diagram illustrating an example of a system 100 that includes a mobile device 102 and a power adapter 110, in accordance with various aspects of this disclosure. Power adapter 110 may be an AC adapter, AC/DC adapter, or AC/DC converter. Power adapter 110 may be a type of external power supply, enclosed in a case (e.g., an AC plug). Power adapter 110 may also be a plug pack, plug-in adapter, adapter block, domestic mains adapter, line power adapter, wall wart, power brick, and power adapter. Power adapter 110 may contain a transformer to convert the mains electricity voltage to a lower voltage. As shown in FIG. 1, power adapter 110 may output a direct current (DC) power signal to mobile device 102 having voltage level $V_{BUS\_IN}$ and current level $I_{BUS\_IN}$.

Mobile device 102 may represent any device that includes a power storage device capable of being recharged by an external power adapter, such as power adapter 110. Examples of mobile device 102 include, but are not limited to, a mobile phone (including a so-called "smartphone"), smart glasses, a smart watch, a portable speaker (including a portable smart speaker), a laptop computer, a portable gaming system, a wireless gaming system controller, and the like. In some examples, mobile device 102 may be a foldable device in that components of mobile device 102 may be distributed across two housings joined by a hinge. As shown in the example of FIG. 1, mobile device 102 may include main charger 112, parallel charger 118, processing circuitry 108, and power storage device 124.

Processing circuitry 108 may represent circuitry configured to support operation of mobile device 102 and may execute software (or, in other words, a set of instructions) that may enable execution of hierarchical software layers to present various functionalities for use by a user. Processing circuitry 108 may, for example, execute a kernel forming a base layer by which an operating system may interface with various other processing units, such as a camera, microphones, sensors, etc. Processing circuitry 108 may also execute the operating system which presents an application space in which one or more applications (e.g., first party and/or third-party applications) may execute to present graphical user interfaces with which to interact with the user.

Processing circuitry 108 may include one or more of a microprocessor, a controller, a digital signal processor (DSP), an accelerated processing unit (APU), an application processor (AP), a central processing unit (CPU), a graphics processing unit (GPU), an application specific integrated circuit (ASIC), a field-programmable gate array (FPGA), or equivalent discrete or integrated logic circuitry. The functions attributed to processing circuitry 108 in this disclosure may be embodied as software (as noted above), firmware, hardware and combinations thereof. Although example mobile device 102 of FIG. 1 is illustrated as including one processing circuitry 108, other example mobile devices according to this disclosure may include multiple processors (or multiple so-called "cores," which is another way to refer to processors when packaged together) configured to execute one or more functions attributed to processing circuitry 108 of mobile device 102 individually or in different cooperative combinations.

Power storage device 124 may be configured to store electrical energy for use by components of mobile device 102. Examples of power storage device 124 include batteries, such as secondary cell rechargeable batteries, and the like. Some examples of batteries include a lithium-ion battery, a nickel-cadmium battery, or any other type of rechargeable battery such as nickel-metal hydride, lead acid or lithium ion polymer. In some examples, power storage device 124 may represent an array of power storage devices. For instance, where mobile device 102 is a foldable device, power storage device 124 may include a first battery in a first housing of the foldable device and a second battery in a second housing of the foldable device.

Main charger 112 may represent a circuit configured to generate a power signal to charge power storage device 124 and/or provide power to other components of mobile device 102. For instance, main charger 112 may operate as a DC/DC power converter. Main charger 112 may be a regulated power converter in that a voltage and/or a current of the power signal output by main charger 112 may be adjusted through operation of components of main charger 112. Examples of such a power converter include DC/DC converters such as buck, boost, buck-boost, Cuk (also known as a two-inductor inverting converter), flyback, or any other type of regulated DC/DC converter.

In operation, main charger 112 may generate heat as a byproduct of the power conversion process. For instance, where main charger 112 is a buck type power converter, the amount of heat generated by main charger 112 may be positively correlated with the voltage of the input power signal received from power adapter 110 (e.g., higher voltages may result in greater amounts of heat). Components of main charger 112 may be selected to produce an acceptable amount of heat at a particular voltage of the input power signal (e.g., at 5 volts). However, some charging standards may allow for increased voltage levels of the input power signal to, e.g., decrease charging time. To enable mobile device 102 to take advantage of such increased voltage levels, mobile device 102 may include a second charger circuit, such as parallel charger 118, that may generate less heat at higher voltage levels of the input power signal than main charger 112.

Parallel charger 118 and main charger 112 may be configured such that only one of parallel charger 118 and main charger 112 provides a power signal to charge power storage device 124 at any given time. For instance, main charger 112 may generate, during a first time period and using electrical energy received from a power source external to the device (e.g., power adapter 110), a first power signal to charge power storage device 124. Parallel charger 118 may generate, during a second time period that is non-overlapping with the first time period, using electrical energy received from the power source, a second power signal to charge power storage device 124. As discussed in further detail below, in some examples, parallel charger 118 and main charger 112 may operate at the same time (e.g., contemporaneously) to accomplish different tasks. For instance, at a particular time, parallel charger 118 may convert a power signal received from power adapter 110 to charge power storage device 124 while main charger 112 generates a power signal to charge another device (e.g., such that mobile device 102 may simultaneously charge power storage device 124 and provide power to another device via wireless transfer).

In some examples, parallel charger 118 may be an unregulated power converter. For instance, parallel charger 118 may be a 2:1 switch-capacitor power converter that converts the input power signal into an output power signal with half the voltage and twice the current (e.g., $V_{BUS\_OUT}=V_{BUS\_IN}/2$ and $I_{BUS\_OUT}=2*I_{BUS\_IN}$). In examples where parallel charger 118 is an unregulated power converter, processing circuitry 108 may provide regulation of the amount of current provided to power storage device 124 via communication with power adapter 110. For instance, parallel charger 118 may output a representation of the amount of current flowing through parallel charger 118. Based on the amount of current flowing through parallel charger 118, processing circuitry 108 may output a request to power adapter 110 to change the voltage (VBUS_IN) of the power signal provided by power adapter 110. While enabling some regulation, this control loop may include one or more disadvantages. As one example, the latency of feedback and control command may be quite large, such that the bandwidth of the whole control scheme is below 0.1 Hz. As another example, the amount of current flowing through parallel charger 118 may not be an accurate representation of how much current is actually being provided to power storage device 124 (e.g., as some of the current provided by parallel charger 118 may be used by an electrical load that includes other system components, such as processing circuitry 108). These disadvantages may result in an inconsistent amount of power being provided to power storage device 124, which may be undesirable. Similarly, with the electrical load siphoning power, the charging speed of power storage device 124 may be decreased.

In accordance with one or more techniques of this disclosure, parallel charger 118 may be a regulated power converter that includes a controller configured to regulate operation of parallel charger 118 based on an amount of current actually being provided to power storage device 124 (e.g., based on $I_{PSD}$). For instance, the controller of parallel charger 118 may determine a charging current at which to charge power storage device 124 (e.g., if power storage device 124 has a capacity of 2400 mAh, the controller may determine to charge power storage device 124 at a charging current of 2400 mA to achieve a 1 C charge rate). The controller of parallel charger 118 may determine a total amount of current flowing to power storage device 124 (e.g., $I_{PSD}$) using any current level sensor, such as a sense resistor. The total amount of current flowing to power storage device 124 may include current sourced by parallel charger 118 (e.g., $I_{PC}$) less current sinked by the electrical load (e.g., $I_{LOAD}$). The controller may adjust operation of parallel charger 118 such that the amount of current actually being provided to power storage device 124 (e.g., $I_{PSD}$) is approximately equal to the determined charging current. In this way, the controller may reduce the latency and/or smooth out the amount of power being provided to power storage device 124. Also, in this way, parallel charger 118 may reduce the amount of time needed to charge power storage device 124.

Figure 2:
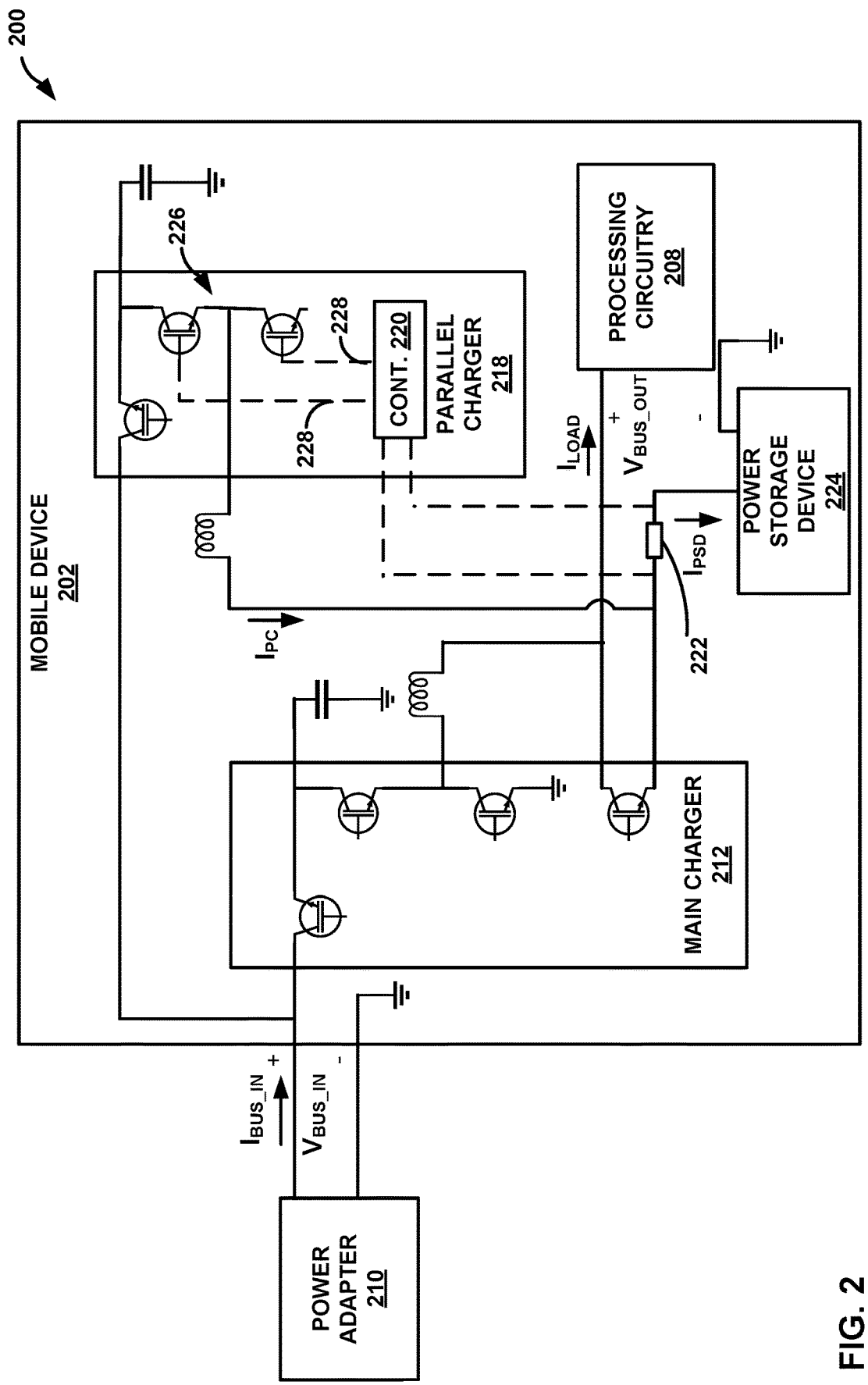
FIG. 2 is a diagram illustrating a schematic representation of an example of a system that includes a mobile device and a power adapter in accordance with examples of the present disclosure.

FIG. 2 is a schematic representation of an example of a system 200 that includes a mobile device 202 and a power adapter 210, in accordance with one or more aspects of the present disclosure. In some examples, system 200 may be considered to be an example of system 100 of FIG. 1. As shown in FIG. 2, mobile device 202 may include processing circuitry 208, main charger 212, parallel charger 218, current sensor 222, and power storage device 224. Processing circuitry 208, main charger 212, parallel charger 218, and power storage device 224 may respectively perform operations similar to processing circuitry 108, main charger 112, parallel charger 118, and power storage device 124 of FIG. 1.

In the example of FIG. 2, parallel charger 218 may contain controller 220 and regulated power converter 226. Regulated power converter 226 may be any type of power converter capable of producing a regulated output power signal. In some examples, regulated power converter 226 may be a switched-mode power converter. For instance, regulated power converter 226 may be a buck, a boost, a buck-boost, a Cuk (also known as a two-inductor inverting converter), a flyback, or any other type of regulated DC/DC converter.

Controller 220 may be configured to control operation of one or more components of parallel charger 218, such as regulated power converter 226. For instance, controller 220 may output one or more signals (e.g., signals 228) to switches of regulated power converter 226 that regulate an amount of current supplied by regulated power converter 226 (e.g., $I_{PC}$). Controller 220 may be any combination of analog and digital controllers. Examples of controller 220 include, but are not limited to, one or more digital signal processors (DSPs), general purpose microprocessors, application specific integrated circuits (ASICs), field programmable logic arrays (FPGAs), systems on a chip (SoC), or other equivalent integrated or discrete logic circuitry. As one specific example, controller 220 may include an analog compensator.

As discussed above and in accordance with one or more aspects of this disclosure, controller 220 may control operation of regulated power converter 226 based on an amount of current flowing to power storage device 224 (e.g., $I_{PSD}$). For instance, controller 220 may regulate the current output of regulated power converter 226 to maintain the amount of the current flowing to power storage device 224 at a specified charging current, regardless of an amount of current supplied by regulated power converter 226 being sinked by other electrical loads (e.g., sinked by processing circuitry 208 as $I_{LOAD}$). As such, controller 220 may cause regulated power converter 226 to generate, based on the total amount of current flowing to power storage device 224, a power signal to charge power storage device 224 at the determined charging current.

As discussed above, controller 220 may perform operations based on an amount of current flowing to power storage device 224. Controller 220 may determine the amount of current flowing to power storage device 224 based on a signal received from current sensor 222 that represents a total amount of current flowing to power storage device 224 (e.g., $I_{PSD}$). For instance, as shown in FIG. 2, current sensor 222 may include a sense resistor in series with power storage device 224 (e.g., such that the current flowing to power storage device 224 also flows through current sensor 222), and controller 220 may receive a representation of a voltage drop across the sense resistor. As the voltage drop across the sense resistor of current sensor 222 is proportional to the amount of current flowing through the sense resistor by the resistance of the sense resistor, controller 220 may determine the total amount of current flowing to power storage device 224 based on the voltage drop across the sense resistor and the resistance of the sense resistor. The resistance of the sense resistor of current sensor 222 may be stored in memory of controller 220 or otherwise be available to controller 220.

As discussed above, controller 220 may control operation of regulated power converter 226. For instance, controller 220 may output signals 228 that control operations of switches of regulated power converter 226. In some examples, signals 228 may be pulse width modulated (PWM) signals and controller 220 may adjust a duty cycle of signals 228 to control the amount of current output by regulated power converter 226 (e.g., adjust the duty cycles to adjust $I_{PC}$).

In operation, an electrical load of mobile device 202 may sink some of the current supplied by parallel charger 218. For instance, processing circuitry 208 may sink an amount of current denoted as $I_{LOAD}$. As such, all of the current generated by regulated power converter 226 may not flow to power storage device 224 (i.e., $I_{PC}$ may not equal $I_{PSD}$). Therefore, if controller 220 were to control regulated power converter 226 to generate $I_{PC}$ to equal a desired charging current of power storage device 224, power storage device 224 may not consistently be charged at the desired charging current. This may present various problems as discussed above (e.g., increased wear on power storage device 224, increased charging duration, etc.).

As discussed above and in accordance with one or more techniques of this disclosure, controller 220 may control operation of regulated power converter 226 to compensate for the dynamic power usage of the electrical load such that the amount of power flowing to power storage device 224 is relatively consistent and approximately equal to the desired charging current. For instance, controller 220 may continuously or periodically monitor the amount of current flowing to power storage device 224 based on signals generated by current sensor 222. If $I_{LOAD}$ increases, perhaps due to a display of mobile device 202 being used or additional computations being performed by processing circuitry 208 during charging, $I_{PSD}$ may begin to decrease from a desired charging current. Controller 220 may sense the increase in $I_{LOAD}$ as a decrease in $I_{PSD}$. Controller 220 may adjust a duty cycle or other parameters of signals 228 to cause regulated power supply 226 to compensate for the change in $I_{LOAD}$. As one example, as $I_{PSD}$ decreases (e.g., where $I_{LOAD}$ increases), controller 220 may raise the duty cycle of signals 228 to increase $I_{PD}$ and correspondingly increase $I_{PSD}$. As another example, as $I_{PSD}$ increases (e.g., where $I_{LOAD}$ decreases), controller 220 may lower the duty cycle of signals 228 to decrease $I_{PD}$ and correspondingly degrease $I_{PSD}$. Controller 220 may implement this control loop at any sufficient frequency. As one specific example, controller 220 may implement the control loop (i.e., adjust operation of regulated power converter 226 based on $I_{PSD}$) at 100 kHz.

Figure 3:
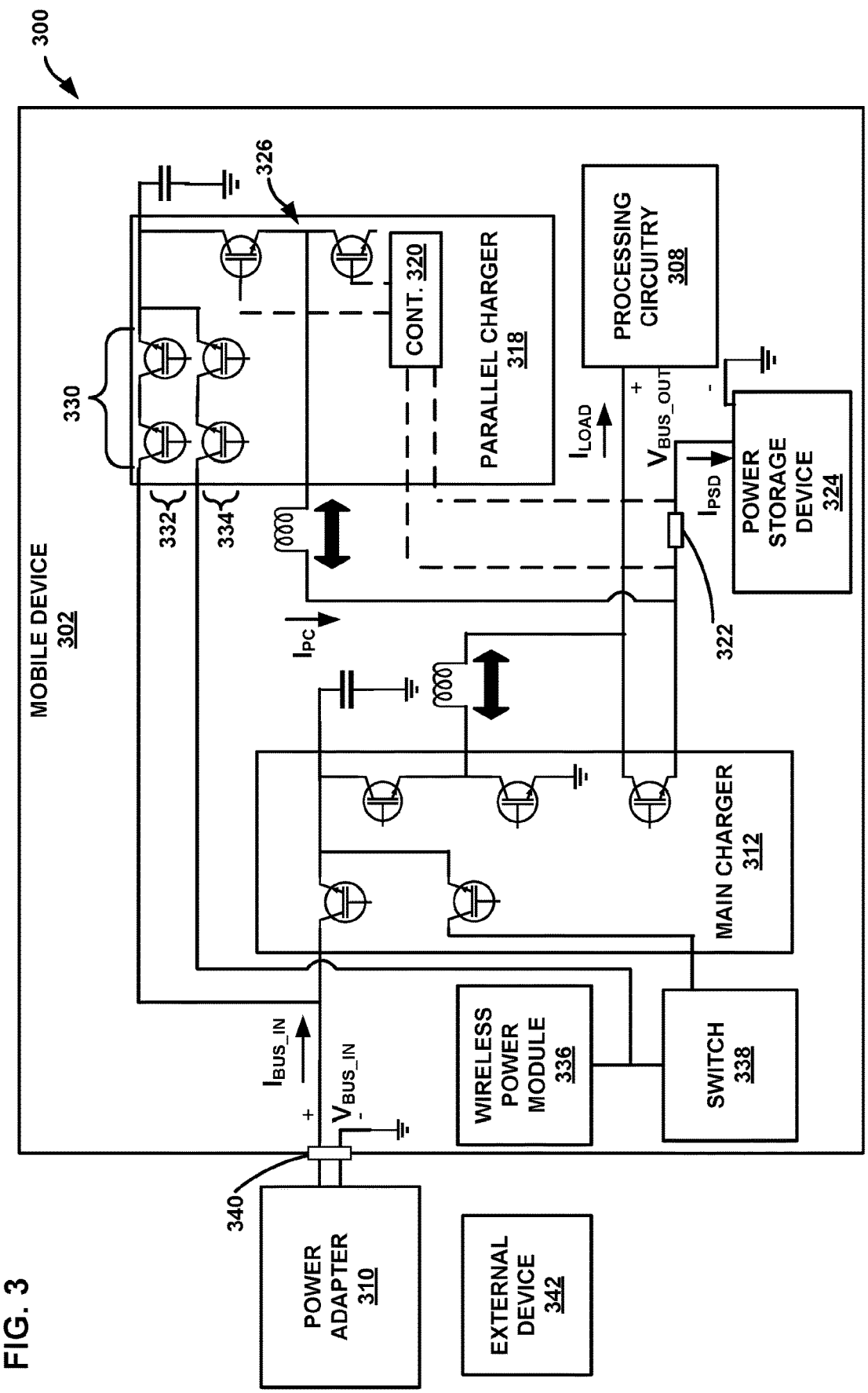
FIG. 3 is a diagram illustrating a schematic representation of an example of a system that includes a mobile device and a power adapter in accordance with examples of the present disclosure.

FIG. 3 is a schematic representation of an example of a system 300 that includes a mobile device 302 and a power adapter 310 in accordance with examples of the present disclosure. In some examples, system 300 may be considered to be an example of system 100 of FIG. 1 and/or system 200 of FIG. 2. As shown in FIG. 3, mobile device 302 may include processing circuitry 308, main charger 312, parallel charger 318, current sensor 322, power storage device 324, wireless power module 336 and switch 338. Processing circuitry 308, main charger 312, parallel charger 318, current sensor 322 and power storage device 324 may respectively at least perform operations similar to processing circuitry 208, main charger 212, parallel charger 218, current sensor 222, and power storage device 224 of FIG. 2.

As also shown in FIG. 3, mobile device 302 may include a wireless power module 336 and wired power interface 340. Wireless power module 336 may be a wireless power interface such as an inductive power interface that utilizes inductive power transfer to power from or to wireless power module 336. Wireless power module 336 may use inductive coupling, resonant inductive coupling, capacitive coupling, magnetodynamic coupling, microwave coupling or light wave coupling. Wireless power module 336 may be used to transfer power to or from an external device 342. Wired power interface may be any wired connection over-which power may be transferred to or from mobile device 302. Examples of wired power interface 340 include, but are not limited to, USB ports (e.g., micro-USB, USB C, Thunderbolt, etc.), proprietary connectors, tip and sleeve ports, and the like.

Mobile device 302 may couple with external device 342. External device 342 may be connected to either wired power interface 340 (e.g., in place of power adapter 310) or wirelessly coupled to wireless power module 336. External device 342 may include a USB charger, for USB cable charging such as a USB cable coupled to a computer or a power brick or USB cable charging with a programmable power supply, such as power adapter 310 through wired power interface 340. External device 342 may be on on-the-go USB load, such as a headset, flash thumb drive, etc. or a wireless device such as a headset or a wireless charger.

In the example of FIG. 3, parallel charger 318 may include additional components and/or functionality as compared to the example of parallel charger 218 in FIG. 2. For instance, in the example of FIG. 3, parallel charger 318 may be configured to operate as a bi-directional regulated power converter. As such, parallel charger 318 may be configured to selectively generate a first power signal to charge power storage device 324 using power sourced from an external power source (e.g., sourced from power adapter 310 through wired power interface 340) and/or generate a second power signal to provide power to an external device 342 that is coupled to mobile device 302 (e.g., using electrical energy sourced from power storage device 324).

Parallel charger 318 may include components configured to direct the flow of electrical energy between parallel charger 318 and external components. For instance, parallel charger 318 may include power switch structure 330. As shown in the example of FIG. 3, power switch structure 330 may include two back-to-back load switches 332 and back-to-back load switches 334. Load switches 332 and 334 may act as a multiplexer enabling power signals generated by regulated power converter 326 to be selectively routed to various destinations (e.g., power storage device 324 and external devices 342 through wireless power module 336 or through wired power interface 340) and enabling regulated power converter 326 to generate said power signals using electrical energy received from various sources (e.g., power adapter 310 and external devices 342). As one example, load switches 332 may enable regulated power converter 326 to selectively source electrical energy from power adapter 310 through wired power interface 340. As another example, load switches 334 may enable regulated power converter 326 to selectively source electrical energy from, or provide electrical energy to, external devices 342. Examples of load switches 332 and 334 include transistors (such as metal oxide semiconductor field effect transistors (MOSFET)), vacuum tubes, logic gates, or network switches. While illustrated as each including two switches, in some examples, each of load switches 332 and 334 may include a single switch.

It may be desirable for mobile device 302 to operate in a wide variety of charging scenarios, including both scenarios where mobile device 302 is receiving power from an external source (e.g., from power adapter 310 through wired power interface 340), where mobile device 302 is providing power to an external device, and where mobile device 302 is simultaneously receiving power from an external source and providing power to an external device. Power transfer in such scenarios may occur over a variety of connection types, including both wireless (e.g., inductive wireless charging including wireless charging using the Qi standard) and wired links (e.g., universal serial bus (USB), including USB power delivery (USB-PD)). Both main charger 312 and parallel charger 318 may be capable of bidirectional power transfer. As discussed below, mobile device 302 may allocate operation to main charger 312 and parallel charger 318 to most efficiently handle each charging scenario.

As shown in FIG. 3, switch 338 of mobile device 302 may enable selective connection of main charger 312 to wireless power module 336. Main charger 312 and parallel charger 318 may handle charging external devices 342, such as cable charging, USB OTG/headset, wireless charging, reverse wireless charging and charging power storage device 324 as well in co-existence use cases. Main charger 312 may also charge external devices through switch 338 or parallel charger 318 may charge external devices 342 through load switches 334 of power switch structure 330. In one example, main charger 312 may handle standard cable charging and wireless charging of power storage device 324, while parallel charger 318 may handle fast cable charging of power storage device 324 and powering external devices (e.g., USB OTG/headset or reverse wireless charging) through power switch structure 330. In the example of FIG. 3, there are three load switches (332, 334 and 338) to multiplex all internal and external charging and use cases.

Table 1 shows a listing of possible charging scenarios and corresponding operations of main charger 312 and parallel charger 318. In the discussion below, the acronyms USB CHG represents using a main charger for USB cable charging such as a USB cable coupled to a computer or a power brick. Parallel CHG represents using parallel charger 318 for USB cable charging with a programable power supply, such as power adapter 310. OTG represents on-the-go USB load, such as a headset, flash thumb drive, etc. WLC Rx represents a wireless receiver for normal wireless charging. WTx represents a wireless transmitter for reverse wireless charging.

In scenario 1 where a USB charger is coupled to mobile device 302 and power storage device 324 is a "dead battery" (e.g., <~2.6V), parallel charger 318 is used to charge power storage device 324 through USB charging, such as wired power interface 340. No charging of external device(s) 342 occurs due to the low power storage device voltage.

In scenario 2 where a USB charger is coupled to mobile device 302, and the user desires to use reverse wireless charging, then main charger 312 may be used to charge power storage device 324 and parallel charger 318 may be used for the reverse wireless charging through wireless power module 336.

In scenario 3 where a wireless charger is coupled to mobile device 302, then main charger 312 may be used to charge power storage device 324 through wireless power module 336 and switch 338.

In scenario 4 where a wireless charger is coupled to mobile device 302 as well as a USB on-the-go (OTG) external device, main charger 312 may charge wirelessly through wireless power module 336 and switch 338 while parallel charger 318 powers the OTG device through switch 338.

In scenario 5-1, where a USB OTG device is coupled to the mobile device 302, then parallel charger 318 may power the OTG device. However, main charger 312 may alternate with parallel charger 318 to power the OTG device as shown in scenario 5-2.

In scenario 6-1, where reverse wireless charger device is coupled to the mobile device 302, then main charger 312 may power the reverse wireless charger. However, parallel charger 318 may alternate with main charger 312 to power the reverse wireless charger as shown in scenario 6-2.

In scenario 7-1, where reverse wireless charger device and an USB OTG device is coupled to the mobile device 302, then main charger 312 may power the reverse wireless charger and parallel charger 318 may power the OTG device. However, parallel charger 318 may alternate with main charger 312 to power the reverse wireless charger and main charger to power the USB OTG device as shown in scenario 7-2.

Scenario 8 displays a scenario where no devices are coupled including power adapter 310.

TABLE 1

Coexistence Use Cases

| Use Scenario | USB Charging | USB OTG | Wireless Charging | Wireless TX | Main charger | Parallel charger |
|---|---|---|---|---|---|---|
| 1 | Y | N | X | N | Dead battery | USB CHG |
| 2 | Y | N | N | Y | USB CHG | WTx 7.5 V |
| 3 | N | N | Y | N | WLC Rx | OFF |
| 4 | N | Y | Y | N | WLC Rx | OTG 5 V |
| 5-1 | N | Y | N | N | OFF | OTG 5 V |
| 5-2 | N | Y | N | N | OTG 5 V | OFF |
| 6-1 | N | N | N | Y | WTx 7.5 V | OFF |
| 6-2 | N | N | N | Y | OFF | WTx 7.5 V |
| 7-1 | N | Y | N | Y | WTx 7.5 V | OTG 5 V |
| 7-2 | N | Y | N | Y | OTG 5 V | WTx 7.5 V |
| 8 | N | N | N | N | OFF | OFF |

Figure 4:
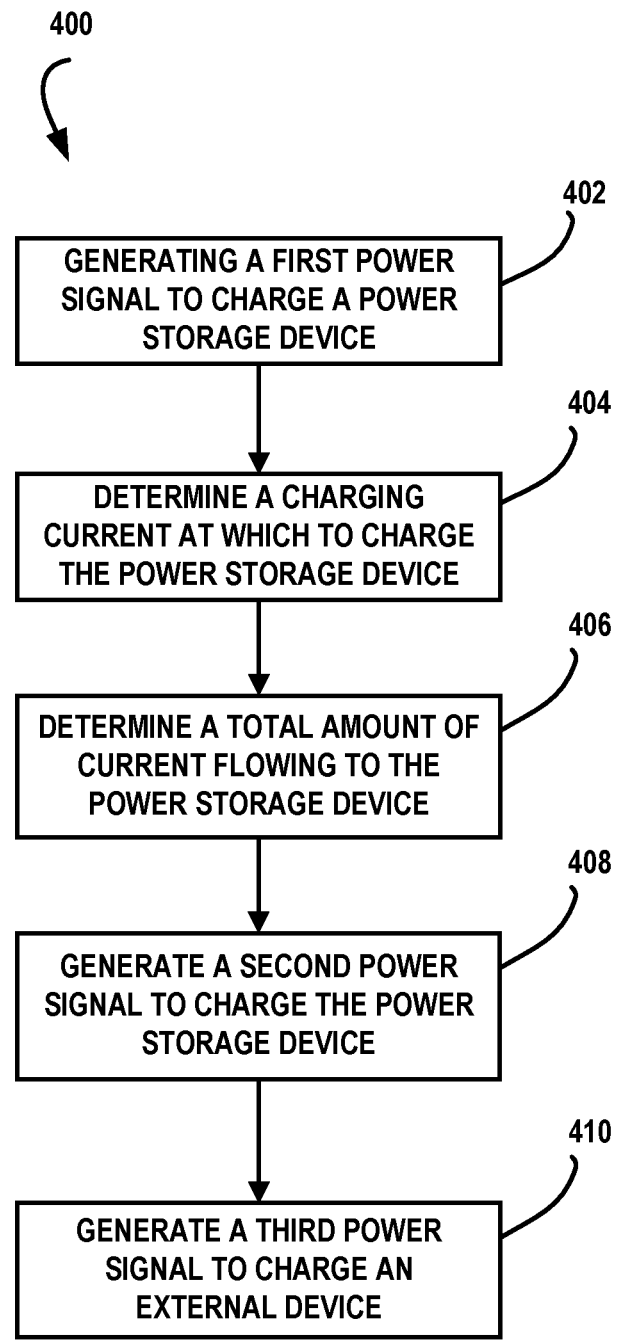
FIG. 4 is a flow diagram illustrating example operation of a parallel charger circuit providing electrical charge for one or more power storage devices in accordance with examples of the present disclosure.

FIG. 4 is a flow diagram illustrating example operation of a parallel charger circuit providing electrical charge for one or more power storage devices in accordance with examples of the present disclosure. For purposes of explanation, the operations shown in FIG. 4 are described in the context of mobile device 302 of FIG. 3. However, other mobile devices may perform the operations of FIG. 4.

During a first time period, main charger 312 of mobile device 302 may generate a first power signal to charge power storage device 324 using electrical energy received from a power source 310 (402). For instance, where a USB charger is coupled to mobile device 302, and the user desires to use reverse wireless charge, then main charger 312 may be used to charge power storage device 324 and parallel charger 318 may be used for the reverse wireless charging through wireless power module 336, main charger 312 may generate a power signal to charge power storage device 324 using electrical energy received from power adapter 310 via wired power interface 340.

During a second time period (e.g., that is different than and non-overlapping with the first time period), it may be desirable for parallel charger 318 of mobile device 302 to generate the power signal to charge power storage device 324. For instance, where a USB charger is coupled to mobile device 302 and power storage device 324 is a "dead battery", parallel charger 318 may be used to charge power storage device 324 through USB charging, such as wired power interface 340, it may be desirable for parallel charger 318 of mobile device 302 to generate a second power signal to charge power storage device 324. To generate the second power signal, parallel charger 318 may determine a charging current at which to charge power storage device 324 (404). For instance, controller 320 of parallel charger 318 may determine a desired value for $I_{PSD}$. As one example, controller 320 may determine the charging current based on a capacity of power storage device 324, such as a 1 C charge rate as discussed above. In some examples, the charging current determined by controller 320 may be the same as the charging current provided by main charger 312 during the first time period. In some examples, the charging current determined by controller 320 may be different than the charging current provided by main charger 312 during the first time period.

Parallel charger 318 may determine a total amount of current flowing to power storage device 324 that includes current sourced by parallel charger 318 less current sinked by an electrical load (406). For instance, controller 320 may determine the amount of current flowing to power storage device 324 based on a signal received from current sensor 322 that represents a total amount of current flowing to power storage device 324 (e.g., $I_{PSD}$).

Parallel charger 318 may generate, during the second time period that is non-overlapping with the first time period, a second power signal to charge power storage device 324 at the determined charging current using electrical energy received from power source 310 and based on the determined total amount of current (408). For instance, controller 320 may adjust a duty cycle of one or more switches of regulated power converter 326 of parallel charger 318 to increase or decrease $I_{PC}$ in order to bring $I_{PSD}$ closer to the determined charging current.

During a third time period (e.g., that is different than and non-overlapping with the second time period), it may be desirable for parallel charger 318 of mobile device 302 to generate a power signal to be provided to an external device (e.g., external device 342 of FIG. 3). For instance, where a wireless charger is coupled to mobile device 302 as well as a USB on-the-go (OTG) external device, main charger 312 may charge wirelessly through wireless power module 336 and switch 338 while parallel charger 318 powers the OTG device through switch 338, it may be desirable for parallel charger 318 of mobile device 302 to generate a third power signal to be output to external device 342 (e.g., OTG device). As such, parallel charger 318 may generate, during the third period of time that is non-overlapping with the second period of time a third power signal to power an external device that is coupled to the device using electrical energy sourced from power storage device 324 (410).

Figure 5:
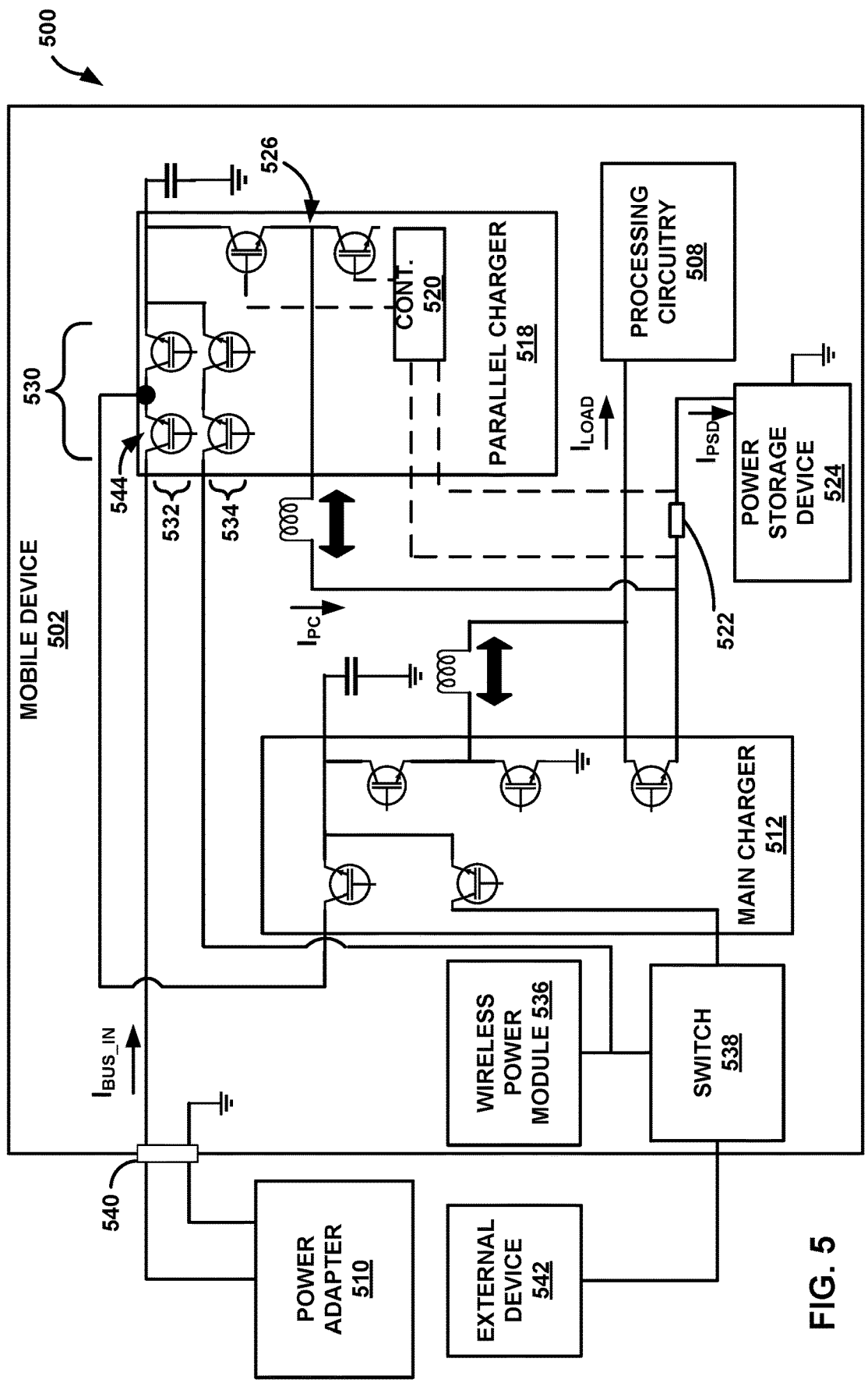
FIG. 5 is a diagram illustrating a schematic representation of an example of a mobile device and power adapter in accordance with examples of the present disclosure.

FIG. 5 is a diagram illustrating a schematic representation of an example of a mobile device and power adapter in accordance with examples of the present disclosure. In some examples, system 500 may be considered to be an example of system 100 of FIG. 1 and/or system 200 of FIG. 2 and/or system 300 of FIG. 3. As shown in FIG. 5, mobile device 502 may include processing circuitry 508, main charger 512, parallel charger 518, current sensor 522, power storage device 524, wireless power module 536, and switch 538. Processing circuitry 508, main charger 512, parallel charger 518, current sensor 522 and power storage device 524 may respectively at least perform operations similar to processing circuitry 208, main charger 212, parallel charger 218, current sensor 222, and power storage device 224 of FIG. 2 and processing circuitry 308, main charger 312, parallel charger 318, current sensor 322, and power storage device 324 of FIG. 3. Mobile device 502 may couple with external device 542.

In mobile devices over voltage protection (OVP) may be useful, especially in the USB path, such as during charging. As such, some mobile devices may include an OVP protection component, such as an OVP switch, in the USB path. The inclusion of such an OVP switch may present one of more disadvantages such as increased part count and board space usage. In accordance with one or more techniques of this disclosure, power flow through mobile device 502 may be configured such that a switch of load switches 532/534 may provide OVP protection. As such, mobile device 502 may include OVP protection without having to include an additional OVP protection component. As shown in FIG. 5, switch 544 of load switches 532 may provide the OVP functionality.

In the example of FIG. 5, the entire flow of power, for power received through wired power interface 540, between power adapter 510 and mobile device 502 now passes through parallel charger 518. Current passing from power adapter 510 through wired power interface 540 passes through OVP switch 54. In an example situation similar to scenario three above, where a wireless charger is coupled to mobile device 502, then main charger 512 may be used to charge power storage device 524 through wireless power module 536 and switch 538. In an example situation like scenario 2 above, where a USB charger is coupled to mobile device 502, and the user desires to use reverse wireless charging for external device 542, then main charger 512 may be used to charge power storage device 524 by routing power from wired power interface 540, through OVP switch 544 to main charger 512 and then to power storage device 524. Parallel charger 518 may be used for the reverse wireless charge through load switches 534 to wireless power module 336 and then wirelessly to external device 542.

Power adapter 510 may be coupled directly to parallel charger 518 at OVP switch 544 in first pair of load switches 532. After passing through the OVP switch 540, $I_{BUS\_IN}$ may pass through regulated power converter 526 through to power storage device 524. Or, $I_{BUS\_IN}$ may pass through parallel charger 518 to main charger 512 depending on the scenarios discussed above regarding charging of power storage device 524 and external device 542.

The following numbered examples may illustrate one or more aspects of the disclosure:

Example 1. A device comprising: a power storage device; an electrical load; a first regulated power converter including components configured to generate, during a first time period and using electrical energy received from a power source external to the device, a first power signal to charge the power storage device; and a second regulated power converter including components configured to: determine a charging current at which to charge the power storage device; determine a total amount of current flowing to the power storage device that includes current sourced by the second regulated power converter less current sinked by the electrical load; and generate, during a second time period that is non-overlapping with the first time period, using electrical energy received from the power source and based on the determined total amount of current, a second power signal to charge the power storage device at the determined charging current.

Example 2. The device of example 1, wherein the second regulated power converter comprises a bi-directional regulated power converter, wherein the components of the bi-directional regulated power converter are further configured to generate, during a third time period that is non-overlapping with the second time period and using electrical energy sourced from the power storage device, a third power signal to power an external device that is coupled to the device.

Example 3. The device of example 1 or 2, wherein the second regulated power converter further comprises: a buck converter configured to generate, using the electrical energy received from the power source, the second power signal to charge the power storage device; and a controller electrically coupled to the buck converter that controls a duty cycle of the buck converter based on the determined total amount of current such that the buck converter generates the second power signal with an amount of current equal to the determined charging current and the current sinked by the electrical load.

Example 4. The device of example 3, further comprising a current sensor configured to generate a signal that represents the total amount of current flowing to the power storage device, wherein the controller is configured to determine the total amount of current flowing to the power storage device based on the signal generated by the current sensor.

Example 5. The device of example 3 or 4, wherein the controller updates the duty cycle of the buck converter at a frequency between 1 Hz to 100 KHz.

Example 6. The device of any of examples 2-5, further comprising: a first set of one or more load switches electrically coupled between the second regulated power converter and the power source; and a second set of one or more load switches electrically coupled between the second regulated power converter and the external device.

Example 7. The device of example 6, wherein: the first set of load switches are configured to direct the electrical energy received from the power source to the second regulated converter; and the second set of load switches are configured to direct the third power signal from the second regulated converter to the external device.

Example 8. The device of example 6, wherein a particular switch of the first set of load switches is configured to operate as an overvoltage protection switch, and wherein the electrical energy used by the first regulated power converter to generate the first power signal flows through the particular switch.

Example 9. The device of any of examples 2-8, further comprising: a wired power interface, wherein the electrical energy used by the first regulated power converter to generate the first power signal flows through the wired power interface; and a wireless power module, wherein the third power signal is output to the external device via the wireless power module.

Example 10. The device of any of examples 1-9, wherein the electrical load comprises one or more of processing circuitry and a display.

Example 11. The device of any of examples 1-10, wherein the power storage device comprises a first power storage device and a second power storage device electrically coupled in parallel with the first power storage device, the second power storage device having a different power storage capacity than the first power storage device.

Example 12. A method comprising: generating, by a first regulated power converter, a first power signal to charge a power storage device during a first time period and using electrical energy received from a power source; determining, by a second regulated power converter, a charging current at which to charge the power storage device; determining, by the second regulated power converter, a total amount of current flowing to the power storage device that includes current sourced by the second regulated power converter less current sinked by an electrical load; and generating, by the second regulated power converter, during a second time period that is non-overlapping with the first time period, using electrical energy received from the power source and based on the determined total amount of current, a second power signal to charge the power storage device at the determined charging current.

Example 13. The method of example 12, further comprising generating, by the second regulated power converter comprising a bi-directional regulated power converter, during a third time period that is non-overlapping with the second time period and using electrical energy sourced from the power storage device, a third power signal to power an external device that is coupled to the device.

Example 14. The method of example 12 or 13, wherein the second regulated power converter further comprises a buck converter that generates the second power signal to charge the power storage device using the electrical energy received from the power source; and further comprising controlling, by a controller electrically coupled to the buck converter, a duty cycle of the buck converter based on the determined total amount of current such that the buck converter generates the second power signal with an amount of current equal to the determined charging current and the current sinked by the electrical load.

Example 15. The method of example 14, further comprising generating, by a current sensor, a signal that represents the total amount of current flowing to the power storage device, wherein the controller is configured to determine the total amount of current flowing to the power storage device based on the signal generated by the current sensor.

Example 16. The method of example 14 or 15, further comprising updating, by the controller, duty cycle of the buck converter at a frequency between 1 Hz to 100 KHz.

Example 17. The method of example 14, further comprising: directing, by a first set of one or more load switches electrically coupled between the second regulated power converter and the power source, the electrical energy received from the power source external to the second regulated power converter; and directing, by a second set of one or more load switches electrically coupled between the second regulated power converter and one or more external devices, the third power signal from the power storage device to the one or more external devices.

Example 18. Any combination of examples 1-17.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device comprising:
a power storage device;
an electrical load;
a first regulated power converter including components configured to generate, during a first time period and using electrical energy received from a power source external to the device, a first power signal to charge the power storage device; and
a second regulated power converter including components configured to:
determine a charging current at which to charge the power storage device;
determine a total amount of current flowing to the power storage device that includes current sourced by the second regulated power converter less current sinked by the electrical load; and
generate, during a second time period that is non-overlapping with the first time period, using electrical energy received from the power source and based on the determined total amount of current, a second power signal to charge the power storage device at the determined charging current.

2. The device of claim 1, wherein the second regulated power converter comprises a bi-directional regulated power converter, wherein the components of the bi-directional regulated power converter are further configured to generate, during a third time period that is non-overlapping with the second time period and using electrical energy sourced from the power storage device, a third power signal to power an external device that is coupled to the device.

3. The device of claim 2, further comprising:
a first set of one or more load switches electrically coupled between the second regulated power converter and the power source; and
a second set of one or more load switches electrically coupled between the second regulated power converter and the external device.

4. The device of claim 3, wherein:
the first set of load switches are configured to direct the electrical energy received from the power source to the second regulated converter; and
the second set of load switches are configured to direct the third power signal from the second regulated converter to the external device.

5. The device of claim 3, wherein a particular switch of the first set of load switches is configured to operate as an overvoltage protection switch, and wherein the electrical energy used by the first regulated power converter to generate the first power signal flows through the particular switch.

6. The device of claim 2, further comprising:
a wired power interface, wherein the electrical energy used by the first regulated power converter to generate the first power signal flows through the wired power interface; and
a wireless power module, wherein the third power signal is output to the external device via the wireless power module.

7. The device of claim 1, wherein the second regulated power converter further comprises:
a buck converter configured to generate, using the electrical energy received from the power source, the second power signal to charge the power storage device; and
a controller electrically coupled to the buck converter that controls a duty cycle of the buck converter based on the determined total amount of current such that the buck converter generates the second power signal with an amount of current equal to the determined charging current and the current sinked by the electrical load.

8. The device of claim 7, further comprising a current sensor configured to generate a signal that represents the total amount of current flowing to the power storage device, wherein the controller is configured to determine the total amount of current flowing to the power storage device based on the signal generated by the current sensor.

9. The device of claim 8, wherein the controller updates the duty cycle of the buck converter at a frequency between 1 Hz to 100 KHz.

10. The device of claim 1, wherein the electrical load comprises one or more of processing circuitry and a display.

11. The device of claim 1, wherein the power storage device comprises a first power storage device and a second power storage device electrically coupled in parallel with the first power storage device, the second power storage device having a different power storage capacity than the first power storage device.

12. A method comprising:
generating, by a first regulated power converter, a first power signal to charge a power storage device during a first time period and using electrical energy received from a power source;
determining, by a second regulated power converter, a charging current at which to charge the power storage device;
determining, by the second regulated power converter, a total amount of current flowing to the power storage device that includes current sourced by the second regulated power converter less current sinked by an electrical load; and
generating, by the second regulated power converter, during a second time period that is non-overlapping with the first time period, using electrical energy received from the power source and based on the determined total amount of current, a second power signal to charge the power storage device at the determined charging current.

13. The method of claim 12, further comprising generating, by the second regulated power converter comprising a bi-directional regulated power converter, during a third time period that is non-overlapping with the second time period and using electrical energy sourced from the power storage device, a third power signal to power an external device that is coupled to the device.

14. The method of claim 12, wherein the second regulated power converter further comprises a buck converter that generates the second power signal to charge the power storage device using the electrical energy received from the power source; and
further comprising controlling, by a controller electrically coupled to the buck converter, a duty cycle of the buck converter based on the determined total amount of current such that the buck converter generates the second power signal with an amount of current equal to the determined charging current and the current sinked by the electrical load.

15. The method of claim 14, further comprising generating, by a current sensor, a signal that represents the total amount of current flowing to the power storage device, wherein the controller is configured to determine the total amount of current flowing to the power storage device based on the signal generated by the current sensor.

16. The method of claim 15, further comprising updating, by the controller, duty cycle of the buck converter at a frequency between 1 Hz to 100 KHz.

17. The method of claim 14, further comprising:
directing, by a first set of one or more load switches electrically coupled between the second regulated power converter and the power source, the electrical energy received from the power source external to the second regulated power converter; and
directing, by a second set of one or more load switches electrically coupled between the second regulated power converter and one or more external devices, the third power signal from the power storage device to the one or more external devices.

18. A device comprising:
a power storage device;
an electrical load;
a first circuit for generating, during a first time period and using electrical energy received from a power source external to the device, a first power signal to charge the power storage device; and
a second circuit for:
determining a charging current at which to charge the power storage device;
determining a total amount of current flowing to the power storage device that includes current sourced by the second circuit less current sinked by the electrical load; and
generating, during a second time period that is non-overlapping with the first time period, using electrical energy received from the power source and based on the determined total amount of current, a second power signal to charge the power storage device at the determined charging current.

19. The device of claim 18, wherein the second circuit comprises a third circuit for generating, during a third time period that is non-overlapping with the second time period and using electrical energy sourced from the power storage device, a third power signal to power an external device that is coupled to the device.

20. The device of claim 18, wherein the second circuit further comprises:
- a third circuit for generating, using the electrical energy received from the power source, the second power signal to charge the power storage device; and
- a fourth circuit electrically coupled to the third circuit for controlling a duty cycle of the third circuit based on the determined total amount of current such that the third circuit generates the second power signal with an amount of current equal to the determined charging current and the current sinked by the electrical load.

* * * * *